US009524149B2

(12) United States Patent
Bouchereau (10) Patent No.: US 9,524,149 B2
(45) Date of Patent: *Dec. 20, 2016

(54) OBJECT PROPERTY-VALUE SPECIFICATION USING POP-UP GRAPHICAL INTERFACES

(71) Applicant: The MathWorks, Inc., Natick, MA (US)

(72) Inventor: Frantz Bouchereau, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/468,128

(22) Filed: Aug. 25, 2014

(65) Prior Publication Data

US 2014/0365997 A1 Dec. 11, 2014

Related U.S. Application Data

(63) Continuation of application No. 13/437,721, filed on Apr. 2, 2012, now Pat. No. 8,819,623.

(51) Int. Cl.
*G06F 9/45* (2006.01)
*G06F 9/44* (2006.01)
*G06F 3/0484* (2013.01)

(52) U.S. Cl.
CPC ............. *G06F 8/34* (2013.01); *G06F 3/04842* (2013.01); *G06F 3/04847* (2013.01); *G06F 9/4428* (2013.01)

(58) Field of Classification Search
None
See application file for complete search history.

(56) References Cited

U.S. PATENT DOCUMENTS 7,099,926 B1 8/2006 Ims et al.
8,560,956 B2 * 10/2013 Curtis ................. G06F 17/21
715/205
8,819,623 B2 8/2014 Bouchereau

* cited by examiner

*Primary Examiner* — Chuck Kendall
(74) *Attorney, Agent, or Firm* — Wilmer Cutler Pickering Hale and Dorr LLP (57) ABSTRACT

A method of populating object property values includes receiving an instruction on behalf of a user. The instruction represents an input indicating selection of the object. The method includes presenting, in response to the input, a list of property names and corresponding default values associated with the selected object, and presenting, for each of one or more default values, a user input field. The method includes presenting, for each of the one or more default values, an enumeration of alternative property values when the enumeration is compatible with the corresponding property. The method includes receiving from the user, for zero or more of the property names, an updated property value that is a selection from a value entered in the user input field or the enumeration of alternative property values, and generating code operative to instantiate the object. The updated property values are associated with the properties of the object.

28 Claims, 6 Drawing Sheets

FIG. 1

| | |
|---|---|
| | 3.00E+05 |
| | 100 |
| | Design Specifications ▼ |
| | TRUE |
| | 2.00E+05 |
| | Auto ▼ |
| | 0.1 |
| | 60 |
| | Sine wave generator ▼ |
| | 1.40E+07 |
| | |
| | Same as input ▼ |
| | Same as input ▼ |
| OK | |

FIG. 2

| dsp.DigitalUpConverter | |
|---|---|
| InputSampleRate | 3.00E+05 |
| InterpolationFactor | 50 |
| FilterCoefficientsSource | Design Specifications ▼ |
| MinimumOrder | FALSE |
| FirstFilterOrder | 25 |
| SecondFilterOrder | 15 |
| NumCICSections | 4 |
| SignalBandwidth | 2.00E+05 |
| StopbandFrequencySource | Property ▼ |
| StopandFrequency | 1.45E+05 |
| OscillatorSource | NCO ▼ |
| CenterFrequency | 1.40E+07 |
| NumAccumulatorBits | 18 |
| NumQuantizedAccumulatorBits | 12 |
| Dither | FALSE |
| | |
| FiltersOutputDataType | Same as input ▼ |
| OutputDataType | Same as input ▼ |
| OK | |

```
classdef myClass < Handle
    %MYCLASS
    properties
        DUC
    end
    methods
        function createDUCObject (obj)
            obj.DUC = dsp.DigitalUpConverter(...
                'InterpolationFactor',50,...
                'MinimumOrder',false,...
                'FirstFilterOrder',26,...
                'SecondFilterOrder',-5,...
                'NumCICSections',4,...
                'StopbandFrequencySource','Property',...
                'StopbandFrequency',-.45e5,...
                'OscillatorSource','NCD',...
                'NumAcumulatorBits',-8,...
                'Dither',false);
        end
    end
end
```

OBJECT PROPERTY-VALUE SPECIFICATION USING POP-UP GRAPHICAL INTERFACES

CROSS-REFERENCED TO RELATED APPLICATIONS

This application is a continuation of U.S. patent application Ser. No. 13/437,721, filed Apr. 2, 2012, titled "OBJECT PROPERTY-VALUE SPECIFICATION USING POP-UP GRAPHICAL INTERFACES", the contents of which is incorporated herein in its entirety.

DETAILED DESCRIPTION

A software object may have an associated set of properties. Each of the properties may take on a particular value. The properties, along with the corresponding values, serve to define the characteristics of the object. The properties and their corresponding values may be organized in a list of property-value pairs.

In order to establish particular values for a set of object properties, a software developer may manually enter property-value pair lists, in order to instantiate an object in the code. But writing code to set up property-value pairs at construction time of an object can be cumbersome and time-consuming when the object has a large number of properties.

Some design tools and/or coding environments include inherent features that can help streamline the process of establishing object property values. For example, some developers have discovered that they can instantiate an object of a given class in the command line workspace, to be able to use tab completion for that class in the MATLAB editor. Doing so allows the developer to fill up the property value pairs of an object faster than manual typing, but it is still a tedious procedure.

Figure 1:
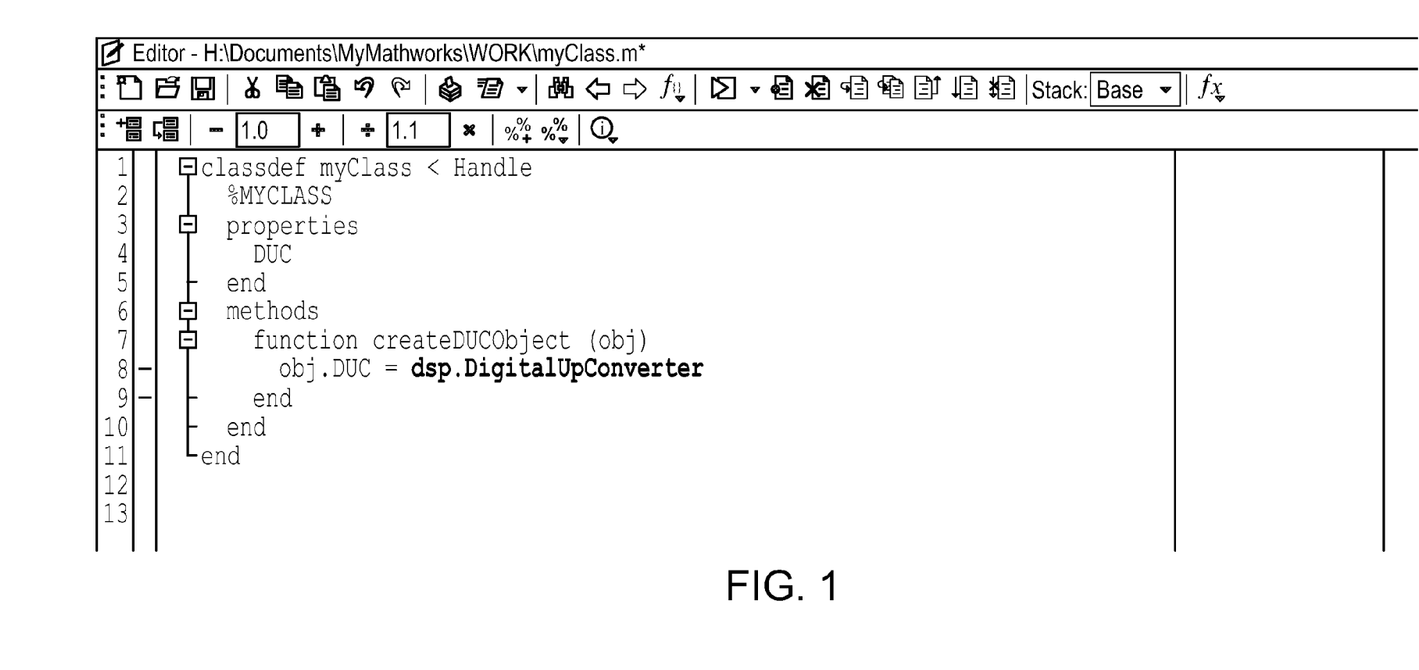
FIG. 1 shows a GUI representation of an object within a class.

The embodiments described herein may speed up the process of instantiating objects in code by utilizing a graphical user interface (GUI) to establish property-value pairs, and automatically generate code in the editor or command window. The GUI, an example of which is shown in FIG. 1, provides a visual representation the object-related concepts describe herein, as well as unrelated tools and effects such as split window editing, cursor effects, selectable windows, among others.

Many of the embodiments described herein may be used in a Technical Computing Environment (TCE), for example MATLAB. A TCE facilitates high-performance numeric computation and visualization. A TCE integrates numerical analysis, matrix computation, signal processing, and graphics into an easy-to-use environment where problems and solutions are expressed just as they are written mathematically, without much traditional programming.

The described embodiments may perform validity checks on property values prior to running the code. When used in, for example, the MATLAB Editor, run-time errors are replaced with code-time errors, thereby reducing the time a software developer spends debugging code.

The described embodiments may be implemented on a particular machine such as a workstation, a personal computer, a mobile computing device, or any other particular machine a software developer deems necessary or desired for carrying out a particular programming task. Further details of such implementation are included herein.

In one embodiment, a software developer (or other user; hereinafter referred to generally as "user") types, enters or otherwise submits a class name in the editor. In this exemplary embodiment, a MATLAB editor is used for illustrative purposes, although the concepts described herein also apply generally to other editors. Further, other embodiments may include a command window GUI rather than an editor GUI for implementing the embodiments described herein.

Once the editor recognizes the class name, the user can cause the editor to launch a property-value pair table dialog by selecting (e.g., by highlighting and/or double clicking with a mouse or other selection tool) the object within the class name text, as show in FIG. 1.

Figure 2:
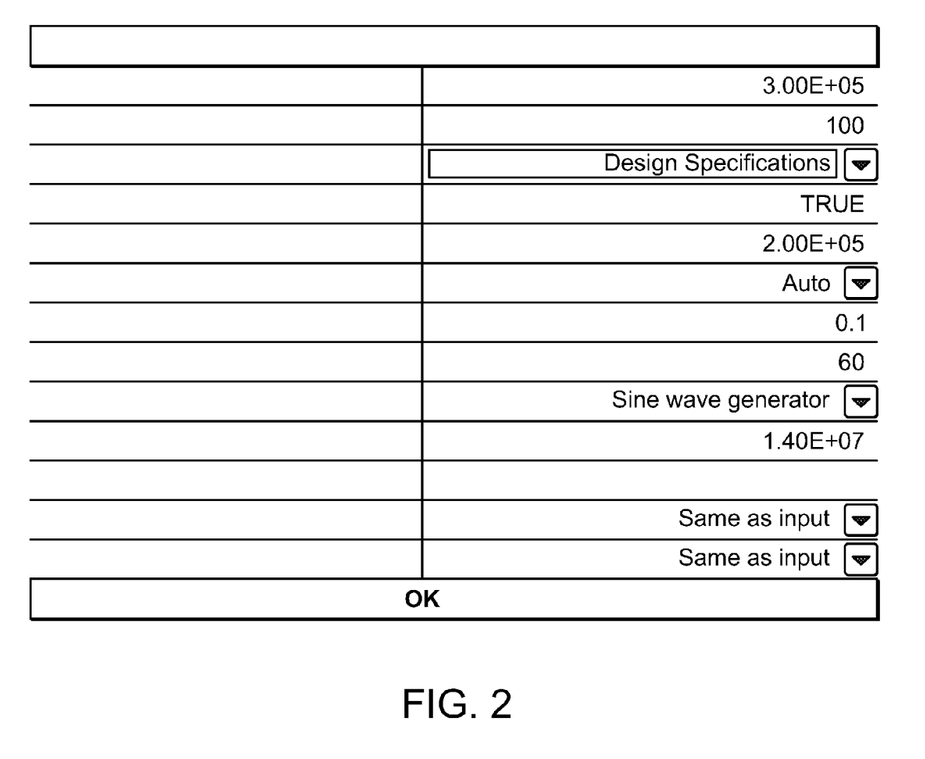
FIG. 2 shows an exemplary property-value pair table for an object as described in FIG. 1.

Upon clicking or otherwise selecting the object, a table with property names and default property values associated with the object is presented to the user through the GUI, as shown in FIG. 2. In one embodiment, all property names and values can be presented to the user. The exemplary object shown in FIG. 2 relates to a digital up-converter.

For this digital up-converter example, only the relevant properties are visible and hidden properties may appear as they become relevant. The determination of which properties are relevant may be based on the particular object, other object(s), the environment or other factors. For example, one property may only be defined when another property exceeds a certain value. Consider an exemplary object "automobile_brake_system," for which the property "emergency_deceleration" could be defined only when the property "speed" exceeds 100 mph.

In other embodiments, all properties are available to the user regardless of their relevance. Properties that have numerical values may be represented in a field within the GUI. The user can enter an initial value into the field, or select and edit an existing value within the field.

Properties may be characterized by a set of limited, predefined values. For example, properties that have ENUM options (i.e., enumerated alternative options) may have drop-down menus from which a selection from an enumerated group can be made. In at least one embodiment, user input fields and the presented enumerations are automatically generated for any object whose class definition code has been developed following a predetermined API or template. In another example, properties that are characterized by Boolean values may be associated with check boxes of which a selection of one or more may be made. In yet another example, properties characterized by mutually-exclusive settings may be associated with "radio buttons" that only one of a set of such radio buttons can be selected at a time.

Figure 3:
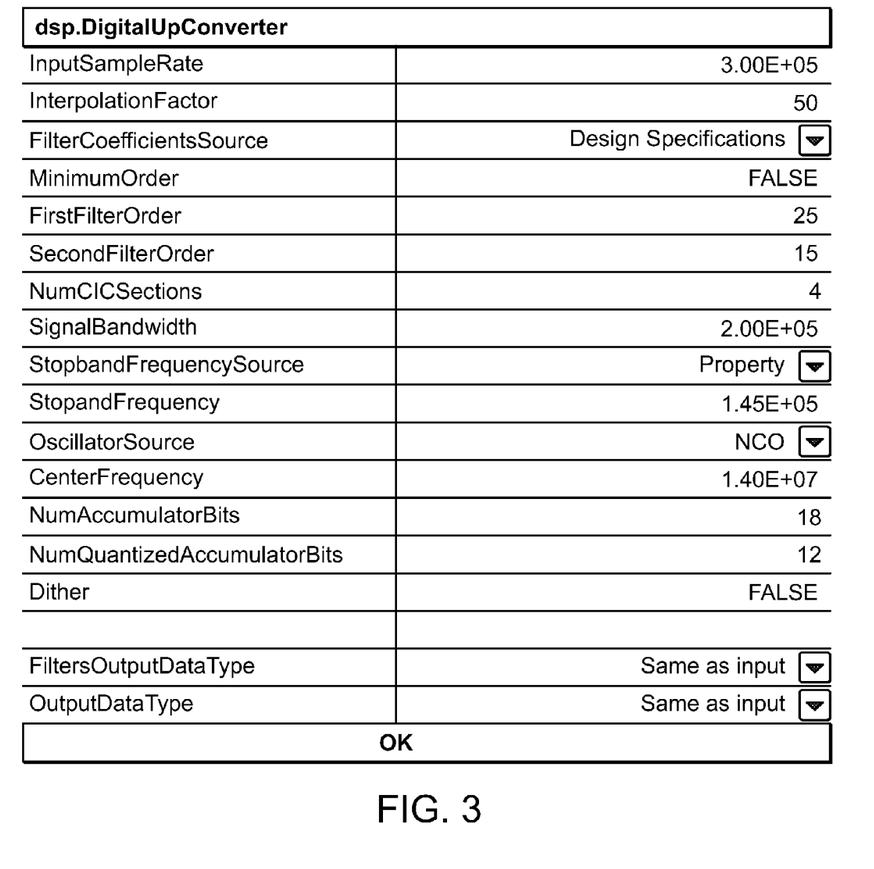
FIG. 3 shows updates incorporated into the table of FIG. 2.

Once the object-property pair table is displayed, the user has the opportunity to set some or all of the property values, as shown in FIG. 3. In some embodiments, this entails manually entering a number into a predefined field within the property-value pair table. In other embodiments, the user makes selections by manipulating drop-down menus. In other embodiments, the user uses both techniques to enter property information.

In the exemplary up-converter object shown in FIG. 3, the user enters a value of "50" to replace the default value of 100 for the property "InterpolationFactor." As the user changes the property "MinimumOrder" from TRUE to FALSE, the previously non-relevant and undisplayed properties of "FirstFilterOrder," "SecondFilterOrder" and "NumCICSections" become relevant and displayed. The user then enters particular values for those properties in the table. The selection of TRUE or FALSE as described above can be accomplished in a number of ways—for example by providing the user with check boxes or radio buttons, or any other appropriate selection mechanism known in the art.

Once all property value entries have been made, the user may click an OK button or field, or otherwise acknowledges that the selections are complete.

In one embodiment, the selections are screened against a range of valid or otherwise acceptable values. The screening may occur prior to the acknowledgement described above, or upon such acknowledgement. One reason for waiting until the acknowledgement is to allow sufficient time for all inputs to be entered for associated properties, i.e., when one or more property values depend on other property values. For example, if the value of property A must be twice the value of property B, properties A and B are associated properties. In the case of associated properties, it may be preferred to not indicate an error until both property values have been entered.

Figure 4:
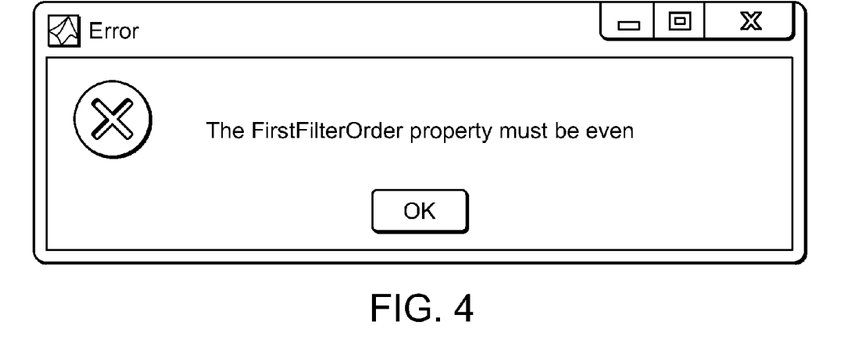
FIG. 4 shows an error message indicating invalid, unacceptable or incompatible input to the table of FIG. 3.

If any of the properties were set to an invalid or unacceptable value, an error message such as the one illustrated in FIG. 4 is presented to the user through the editor GUI. In one embodiment, the property values are evaluated to determine whether or not they are within the range of allowed values for the corresponding property. For example, a particular property may require an integer property value, so that a property value in floating point format with a fractional portion would not be in the range of allowed values for that property.

For the example shown in FIG. 4, the value associated with the property "FirstFilterOrder" must be an even number. Since the user entered a "25" for the FirstFilterOrder property, the GUI presented an error message telling the user that the property value must be even. If other invalid or otherwise unacceptable values are detected, error messages similar to the one shown in FIG. 4 are presented to the user through the GUI.

Figure 5:
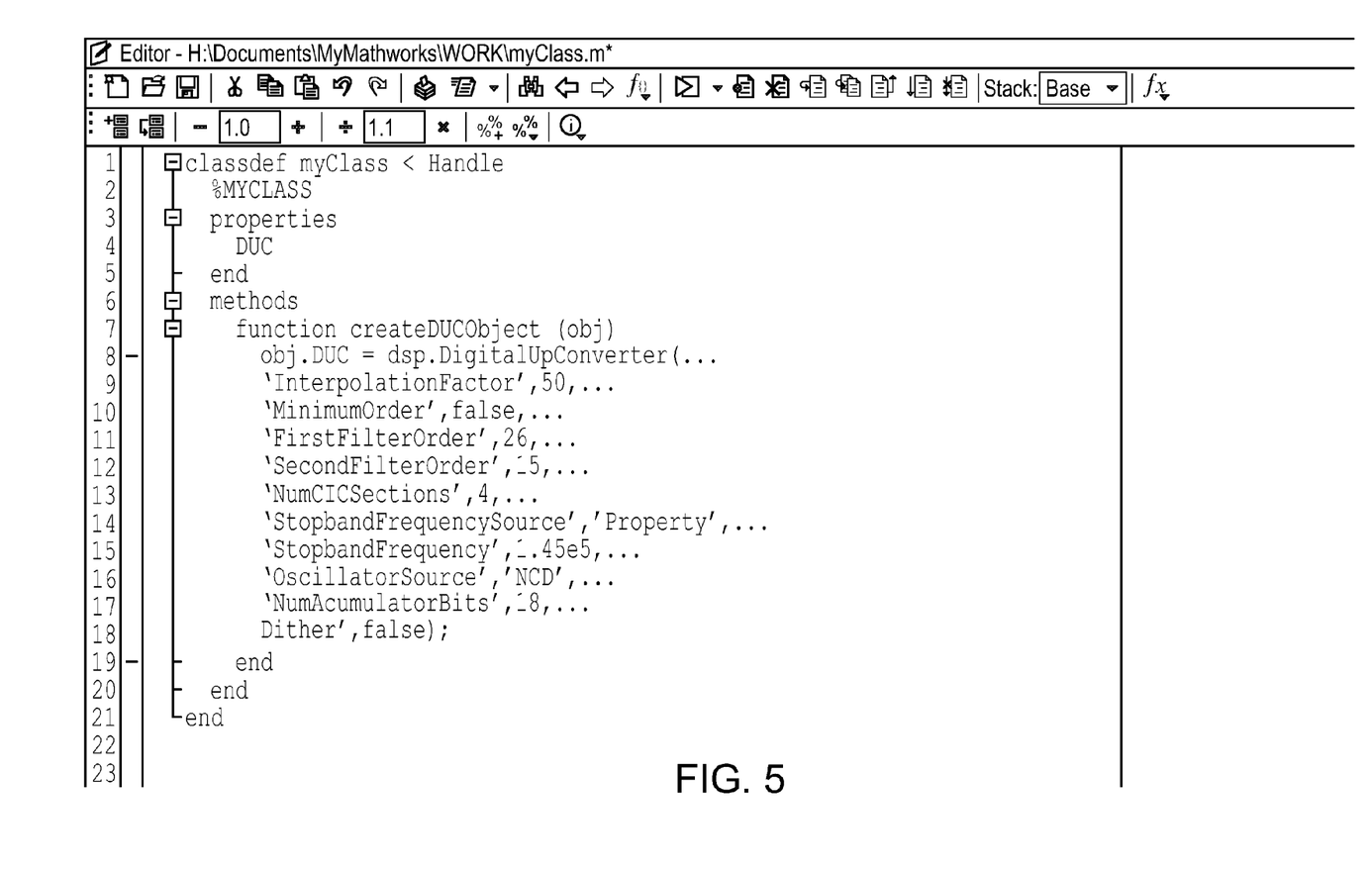
FIG. 5 shows object instantiation code generated according to the values shown in FIG. 3.

In this example, the user corrects the FirstFilterOrder error and any other errors that were indicated. When the user is satisfied that all of the errors have been corrected, the user once again acknowledges that the selections are complete. If the editor determines that all of the property values are acceptable, the editor generates code for instantiating the object, as shown in FIG. 5. The code corresponds to the property settings established in the property-value pair table. In at least one embodiment, the code is not generated until the user corrects all errors, incompatibilities or unacceptable property values. In other embodiments, the code is generated whenever the user inputs new property values into the table.

If the editor detects that a property has retained its default value, the editor in one embodiment omits that property setting in the code since the default value already exists and does not need to be reestablished. In other embodiments all property values are included in the code regardless of whether the user changes the default value.

Figure 7:
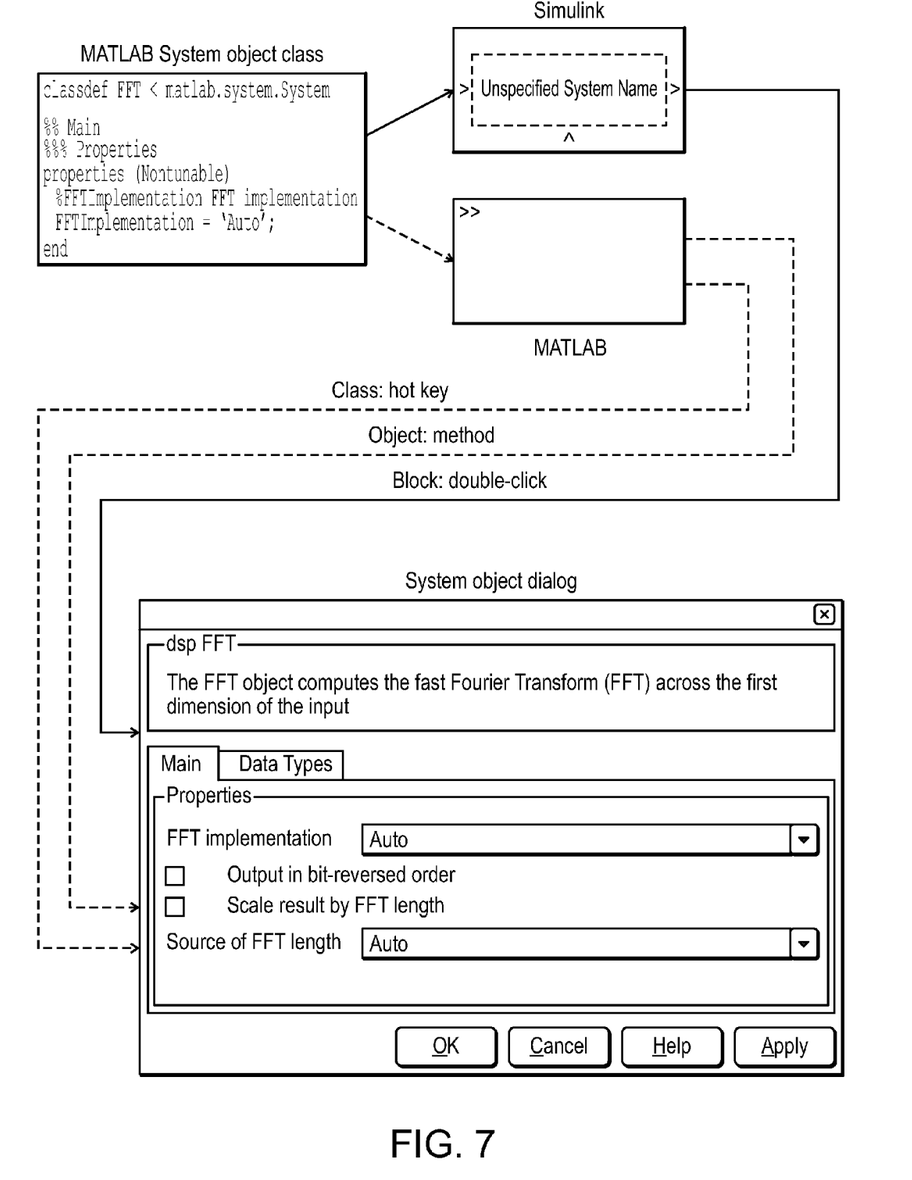
FIG. 7 illustrates one example of a System Object Dialog generated from a MATLAB system object class.

One embodiment includes automatic dialog construction performed with System objects. System object dialogs are property dialogs that are automatically generated from (for example) MATLAB System object class files. These dialogs are available for any MATLAB System object class without any additional coding necessary on than the class definition; however, easy-to-use markup is available for further customization. Automatic dialogs based on System object class definition are available from MATLAB or from Simulink blocks. FIG. 7 illustrates one example of a System Object Dialog generated from a MATLAB system object class.

Embodiments described herein can be implemented on various types of computer systems (e.g., desktop, laptop or notebook PC, mobile handheld computing system, workstation or other particular machine). Described embodiments may be implemented in a computer program product that may be non-transitory and may be tangibly embodied in a machine-readable storage medium for execution by the computer system. Methods of described embodiments may be performed by a computer system executing a program to perform functions, described herein, by for example, operating on input data and/or generating output.

Figure 6:
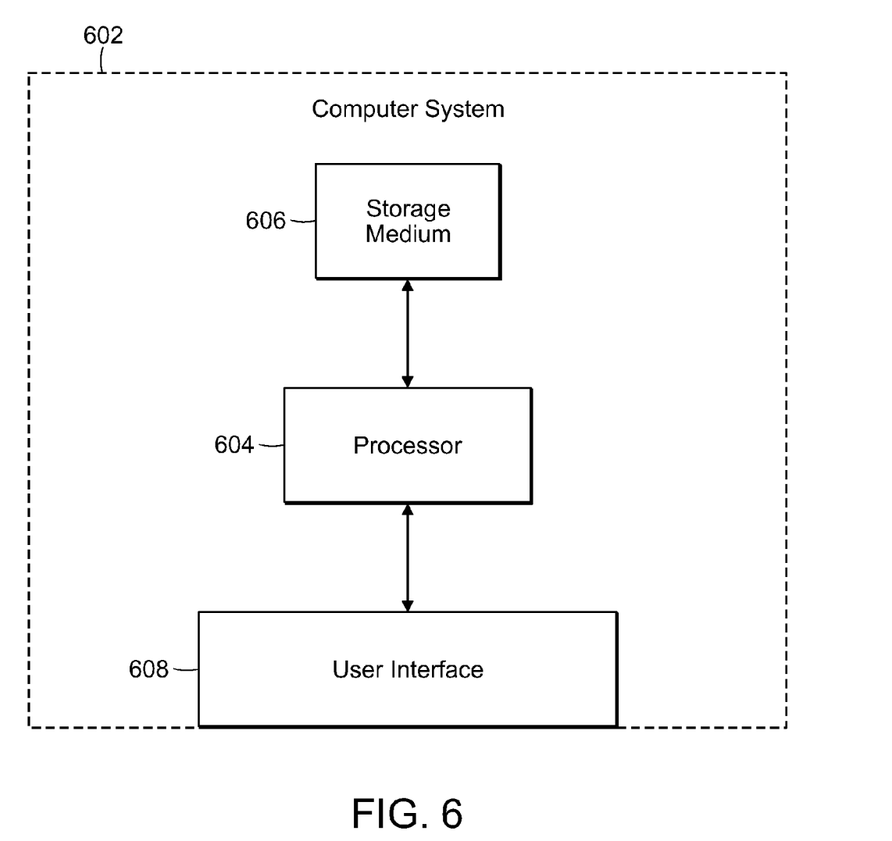
FIG. 6 shows an exemplary computer system for implementing the embodiments described herein.

An exemplary computer system 602 is shown in FIG. 6. Referring to FIG. 6, computer system 602 may include a processor 604, an information storage medium 606, and a user interface 608. These components may be contained within a typical desktop, laptop or mobile form factor housing, or they may be integrated into a single component such as a multi-chip module or ASIC (application specific integrated circuit).

Suitable processors 604 may include, for example, both general and special purpose microprocessors. Generally, the processor 604 receives instructions and data from a read-only memory (ROM) and/or a random access memory (RAM) through a CPU bus. The processor 604 may also receive programs and data from a storage medium 606, such as, for example, an internal disk operating through a mass storage interface, or a removable disk operating through an I/O interface. Instructions for executing the described embodiments may be stored on the storage medium.

Information storage media 606 suitable for tangibly embodying computer program instructions for implementing the described embodiments may include various forms of volatile memory and/or non-volatile memory, including but not limited to, semiconductor memory devices, such as EPROM, EEPROM, and flash memory devices, and magnetic disks, such as internal hard disks and removable disks, magneto-optical disks, and CD-ROM disks. The information storage medium 606 may also store an operating system ("OS"), such as Windows or Linux, which the processor may execute to provide, for example, a supervisory working environment for the user to execute and control, for example, one or more embodiments of the invention.

The user interface 608 may include a keyboard, mouse, stylus, microphone, trackball, touch-sensitive screen, or other input device. These elements are typically found in a conventional desktop computer as well as other computers and workstations suitable for executing computer programs implementing methods described herein. The computer system 602 may also be used in conjunction with a display device for providing a GUI. The display device may include an output device that may be capable of producing color or gray scale pixels on paper, film, display screen, or other output medium.

The touch-sensitive screen described above may be used to effect a multi-point input interface. For example, the user may sequentially or simultaneously select items in the GUI using two or more fingers.

The described embodiments are not limited to an implementation that is contained within a single platform. The described embodiments may also be suitable for use in a distributed computing environment or in an environment of computing devices communicating through a network or other linked architecture. For example, a user may utilize functionality in a mobile device that enables the mobile device to communicate and cooperate wirelessly with a workstation. The user may employ the concepts of the described embodiments to bind an entity displayed on the mobile device (e.g., an HMI element) with an entity displayed on the workstation (e.g., an expression from a piece of code) by selecting those entities as displayed on their respective output devices (e.g., screens). For example, the selection may be accomplished by touching the respective screens with a finger from each of the user's hands.

The foregoing description of embodiments is intended to provide illustration and description, but is not intended to be exhaustive or to limit the invention to the precise form disclosed. Modifications and variations are possible in light of the above teachings or may be acquired from a practice of the invention. Further, non-dependent acts may be performed in parallel. Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored on one or more tangible computer-readable storage media and may include computer-executable instructions that may be executed by a processor, such as processor 1204. The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

The invention claimed is:

1. An apparatus comprising:
   at least one processor configured to execute computer readable program code stored in a non-transient computer readable medium, the code being configured to cause the at least one processor to:
   receive a first input instruction indicating selection of an object represented by code;
   generate on a display, in response to the first input instruction, a list of property names associated with the selected object;
   provide a user interface to receive user input for one or more of the property names for configuring a value for the corresponding property name or to provide one or more default values associated with the selected object;
   generate code operative to instantiate the object, the code being generated based on:
   default values for one or more of the property names,
   the user input for the one or more of the property names, or
   a combination of the above; and
   display the generated code on the display.

2. The apparatus of claim 1, wherein the program code is further configured to cause the at least one processor to evaluate the user input for the one or more of the property names to identify an invalid property value.

3. The apparatus of claim 1, wherein the program code is further configured to cause the at least one processor to determine that the user input for the one or more of the property names is within a range of allowed values for the corresponding property.

4. The apparatus of claim 3, wherein the program code is further configured to cause the at least one processor to determine that the user input for the one or more of the property names is within a range of allowed values for the corresponding property in response to the at least one processor receiving the user input.

5. The apparatus of claim 1, wherein the program code is further configured to cause the at least one processor to determine that the user input for one of the property names is incompatible with user input for other property names.

6. The apparatus of claim 1, wherein the program code is further configured to cause the at least one processor to indicate an error prior to generating code in response to the user input for the one or more of the property names being identified as invalid.

7. The apparatus of claim 1, wherein the user interface includes at least one of:
   a user-editable input field to provide the user input for the one or more of the property names, and
   a user-selectable list of alternative property values from which the user can select the user input for the one or more of the property names.

8. The apparatus of claim 7, wherein the program code is further configured to cause the at least one processor to present the object, the list of alternative property values, and the user-editable input field within the user interface.

9. The apparatus of claim 8, wherein the presented list of property names and corresponding default values, the presented user-editable input fields and the presented list of alternative property values are automatically generated for any object whose class definition code has been developed following at least one of a predetermined API and a template.

10. The apparatus of claim 1, wherein the program code is further configured to cause the at least one processor to:

add zero or more additional property names and associated default values in response to receiving the user input for the one or more of the property names;

to delete zero or more property names and associated property values in response to receiving the user input for the one or more of the property names; and present a modified list of property names to the user.

11. The apparatus of claim 1, wherein the program code is further configured to cause the at least one processor to present the generated object instantiation code in a design environment.

12. An apparatus comprising:
at least one processor configured to execute computer readable program code stored in a non-transient computer readable medium, the code being configured to cause the at least one processor to:
identify, in response to an input instruction, code representing an object;
display on a display a table that provides one or more properties associated with the object;
provide a user interface to receive user input for one or more of the property names for configuring a value for the corresponding property name or to provide one or more default values associated with the selected object;
display a modified table including the user input for the one or more of the property names, and any default values; and
generate code operative to instantiate the object, the code being generated based on:
default values for one or more of the property names, the user input for the one or more of the property names, or
a combination of the above; and
display the generated code on the display.

13. The apparatus of claim 12, wherein the program code is further configured to cause the at least one processor to generate the code in response to receiving an indication from a user.

14. The apparatus of claim 13, wherein the received indication includes an acknowledgement that the user has finished providing modifications.

15. The apparatus of claim 12, wherein the program code is further configured to cause the at least one processor to determine that the modified table includes an invalid property value.

16. The apparatus of claim 15, wherein the invalid property value is characterized by not being within a range of allowed values for the corresponding property.

17. The apparatus of claim 16, wherein the program code is further configured to cause the at least one processor to determine that the user input for the one or more of the property names is not within the range of allowed values when the user enters the updated property value.

18. The apparatus of claim 15, wherein an invalid property value is characterized by an incompatibility with other property values in the modified table.

19. The apparatus of claim 15, wherein the program code is further configured to cause the at least one processor to provide a notification if the modified table is determined to include invalid property values.

20. The apparatus of claim 15, wherein the program code is further configured to cause the at least one processor to delay the code generating until the invalid property values have been resolved.

21. The apparatus of claim 12, wherein the program code is further configured to cause the at least one processor to present the generated code in a design environment.

22. The apparatus of claim 12, wherein the program code is further configured to cause the at least one processor to display at least one of the table and the modified table in the user interface.

23. The apparatus of claim 22, wherein the user interface includes at least one of:
a user-editable input field to provide the user input for the one or more of the property names, and
a user-selectable list of alternative property values from which the user can select the user input for the one or more of the property names.

24. An apparatus comprising:
at least one processor configured to execute computer readable program code stored in a non-transient computer readable medium, the code being configured to cause the at least one processor to generate a user interface, the user interface:
presenting at least one object represented by code;
receiving a selection, the selection indicating one of the at least one objects;
presenting at least one property corresponding to the selected object;
receiving user input for configuring a value for one of the at least one property or to provide one or more default values associated with the selected object; and
presenting code operative to instantiate the object, wherein the code is presented based on:
a default value for at least one property,
the value for the one of the at least one property, or
a combination of the above.

25. The apparatus of claim 24, wherein the program code is further configured to cause the user interface to provide an indication that the value for the one of the at least one property is invalid.

26. The apparatus of claim 24, wherein the program code is further configured to cause the user interface to provide an indication that the value for the one of the at least one property is incompatible with other property values.

27. The apparatus of claim 24, wherein the program code is further configured to cause the user interface to:
add zero or more additional properties and associated default values in response to receiving the value for the one of the at least one property; and
delete zero or more properties and associated property values in response to receiving the value for the one of the at least one property.

28. The apparatus of claim 24, wherein the program code is further configured to cause the user interface to be configured to allow the user to modify the code operative to instantiate the object.

* * * * *